(12) United States Patent
Pal et al.

(10) Patent No.: US 9,769,179 B2
(45) Date of Patent: *Sep. 19, 2017

(54) PASSWORD AUTHENTICATION

(71) Applicant: Red Hat, Inc., Raleigh, NC (US)

(72) Inventors: Dmitri V. Pal, Framingham, MA (US); Stephen J. Gallagher, Methuen, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/156,064

(22) Filed: May 16, 2016

(65) Prior Publication Data
US 2016/0261604 A1   Sep. 8, 2016

Related U.S. Application Data

(63) Continuation of application No. 13/408,747, filed on Feb. 29, 2012, now Pat. No. 9,367,678.

(51) Int. Cl.
*G06F 7/04* (2006.01)
*G06F 12/00* (2006.01)
(Continued)

(52) U.S. Cl.
CPC .......... *H04L 63/105* (2013.01); *G06F 21/31* (2013.01); *G06F 21/33* (2013.01); *H04L 9/3215* (2013.01);
(Continued)

(58) Field of Classification Search
CPC . G06F 21/33; G06F 21/31; G06F 7/04; G06F 12/00; G06F 12/14; G06F 13/00;
(Continued)

(56) References Cited

U.S. PATENT DOCUMENTS 6,453,353 B1   9/2002  Win et al.
6,715,082 B1   3/2004  Chang et al.
(Continued)

OTHER PUBLICATIONS

"Strong Authentication with One-Time Passwords in Windows 7 and Windows Server 2008 R2", first published Feb. 7, 2011, updated Jan. 14, 2012, 8 pages, Microsoft; downloaded from https://technet.microsoft.com/en-us/library/gg637807(v=ws.10). aspx on May 10, 2016.
(Continued)

*Primary Examiner* — Jayesh Jhaveri
(74) *Attorney, Agent, or Firm* — Lowenstein Sandler LLP

(57) ABSTRACT

A user credential comprising a user password and a one-time password (OTP) may be provided to access a computing system. The user password is authenticated and the network connection status of the computing system is determined. If the computing system is offline, the user password and the OTP are stored in memory and the user is granted a first level of access to the computing system. Upon detecting that the network connection status of the computing system has changed to online, the user password and the OTP are provided to an authentication server for authentication. If the authentication of the user password and the OTP is successful, the user is granted a second level of access to the computing system, the second level of access being higher than the first level of access.

20 Claims, 6 Drawing Sheets

(51) Int. Cl.
    *G06F 12/14*     (2006.01)
    *G06F 13/00*     (2006.01)
    *G11C 7/00*     (2006.01)
    *H04L 29/06*     (2006.01)
    *G06F 21/31*     (2013.01)
    *G06F 21/33*     (2013.01)
    *H04L 9/32*     (2006.01)

(52) U.S. Cl.
CPC .......... H04L 9/3226 (2013.01); H04L 9/3228 (2013.01); H04L 63/0838 (2013.01); *H04L 9/321* (2013.01); *H04L 9/3213* (2013.01); *H04L 63/067* (2013.01); *H04L 63/083* (2013.01); *H04L 63/0807* (2013.01); *H04L 2463/082* (2013.01)

(58) Field of Classification Search
CPC . H04L 63/083; H04L 63/0838; H04L 63/067; H04L 9/3228; H04L 2463/082; H04L 63/0807; H04L 9/321; H04L 9/3213; G11C 7/00
USPC .......................... 726/5–10, 19; 713/182–185
See application file for complete search history.

(56) References Cited

U.S. PATENT DOCUMENTS

| | | | |
|---|---|---|---|
| 6,952,781 B1 | 10/2005 | Chang et al. | |
| 7,225,464 B2 | 5/2007 | Satyavolu et al. | |
| 7,716,489 B1* | 5/2010 | Brandt | G06F 21/335 |
| | | | 713/180 |
| 7,752,450 B1 | 7/2010 | Palmer et al. | |
| 8,060,922 B2 | 11/2011 | Crichton et al. | |
| 8,528,059 B1 | 9/2013 | Labana et al. | |
| 8,615,548 B1 | 12/2013 | Juillard | |
| 8,689,294 B1* | 4/2014 | Thakur | H04L 63/08 |
| | | | 713/182 |
| 8,800,003 B2* | 8/2014 | Guo | H04L 63/0823 |
| | | | 726/4 |
| 8,949,951 B2 | 2/2015 | Wood et al. | |
| 2005/0125406 A1 | 6/2005 | Cina | |
| 2007/0157298 A1 | 7/2007 | Dingwall et al. | |
| 2007/0234063 A1 | 10/2007 | Ueda et al. | |
| 2008/0072303 A1* | 3/2008 | Syed | H04L 63/0807 |
| | | | 726/10 |
| 2008/0077972 A1 | 3/2008 | Chou et al. | |
| 2008/0103984 A1* | 5/2008 | Choe | G06Q 20/20 |
| | | | 705/76 |
| 2009/0007250 A1* | 1/2009 | Pouzin | G06F 21/335 |
| | | | 726/10 |
| 2009/0063850 A1* | 3/2009 | Joram | G06F 21/40 |
| | | | 713/155 |
| 2009/0106826 A1 | 4/2009 | Palestrant | |
| 2009/0259588 A1 | 10/2009 | Lindsay | |
| 2009/0292927 A1 | 11/2009 | Wenzel et al. | |
| 2010/0122091 A1 | 5/2010 | Huang et al. | |
| 2011/0142234 A1* | 6/2011 | Rogers | G06F 21/35 |
| | | | 380/247 |
| 2011/0197266 A1 | 8/2011 | Chu et al. | |
| 2011/0225625 A1 | 9/2011 | Wolfson et al. | |
| 2011/0283338 A1 | 11/2011 | Yang et al. | |
| 2012/0084734 A1 | 4/2012 | Wilairat | |
| 2012/0204245 A1* | 8/2012 | Ting | G06F 21/35 |
| | | | 726/6 |
| 2012/0323717 A1 | 12/2012 | Kirsch | |
| 2013/0159195 A1 | 6/2013 | Kirillin et al. | |
| 2013/0185778 A1 | 7/2013 | Tamai et al. | |

OTHER PUBLICATIONS

"YubiKey," Drupal.org, first post Dec. 31, 2008, downloaded from http://drupal.org/project/yubikey on Apr. 5, 2012, 2 pages.

* cited by examiner

PASSWORD AUTHENTICATION

RELATED APPLICATIONS

The present application is a continuation of U.S. patent application Ser. No. 13/408,747, filed Feb. 29, 2012, which is incorporated by reference herein.

TECHNICAL FIELD

Embodiments of the present invention relate to managing a computing system, and more specifically, to authentication and/or access for/to a computing system.

BACKGROUND

Computing systems such as desktop computers, laptop computers, tablets, netbooks, and servers, are now commonly used by various people and organizations. For example, students may use laptops when they attend classes on a school campus and employees may use desktops, laptops, tablets and servers when working at corporate/company locations. Computing systems may often be mobile computing systems, such as laptops, netbooks, smart phones, and personal digital assistants (PDAs). These mobile computing systems allow users to perform tasks at different locations (e.g., at home or at a coffee shop, rather than at a corporate office), due to the mobility of the mobile computing systems. Mobile computing systems may also provide users with convenient access to a computing system, when the user is not able to access a desktop computer or server. Many users use mobile computing systems because of the convenience and portability of the mobile computing systems.

As the prevalence of computing systems grows, authentication of users and system security on the computing systems continues to be an important concern. Many computing systems use a user password to allow a user access to the computing system (e.g., log into the computing system). If a non-authorized person obtains a user's password, then the non-authorized person may be able to obtain the privileges and the level of access the user had to the computing system. After gaining the privileges/access of the user, a non-authorized person may attempt to change the settings on the computing system, access network resources, and/or attempt to access sensitive data (e.g., access to the user's files on a local hard drive) on the computing system. For example, the non-authorized person may change network settings on the computing system to redirect network traffic to a different server. In another example, the non-authorized person may attempt to install malicious programs such as spyware, malware, viruses, trojans, keyloggers, and/or worms on the user's computing system. In a further example, the non-authorized person may be able connect to the network resources after gaining the privileges/access of the user. The non-authorized person might gain access to the network resources such as shared files, documents, emails, network drives, websites, and/or network services, by impersonating the user (e.g., by using a user's username and/or password).

In order to enhance the security of computing systems, some computing systems use multi-factor authentication. A multi-factor authentication may use three authentication factors: 1) something the user knows (e.g., the user's password); 2) something the user has (e.g., a security token or smart card); and 3) something the user is (e.g., a biometric factor such as a fingerprint, retinal scan, etc.). One common form of multi-factor authentication is two-factor authentication in which the first factor is the user password and the second factor is a one-time password (OTP). An OTP is generally a password which is valid for one login session or transaction. The OTP may be generated by a security token (e.g., a YubiKey® USB token, a physical token, a software token, etc.). A user may input the OTP manually (e.g., via a keyboard), when logging onto a computing system or the security token itself may provide the OTP to the computing system when the security token is coupled to the device (e.g., a YubiKey® token may provide the OTP to the computing system via Universal Serial Bus (USB) interface). The OTP provides an extra layer of security in addition to the user password. Some two-factor authentication systems may use a Personal Identification Number (PIN) which the user may provide to the security token, before the security token generates an OTP. The term OTP, as used herein, may refer to the OTP password or may refer to both the OTP and the PIN provided by the user, which may be included as an optional, static portion of the OTP.

Two-factor authentication systems generally authenticate the OTP before the user is given access to the computing system. The OTP is generally authenticated by an authentication server. If the computing system is unable to communicate with the authentication server, the computing system is unable to authenticate the OTP and the user may be denied access to the computing system.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
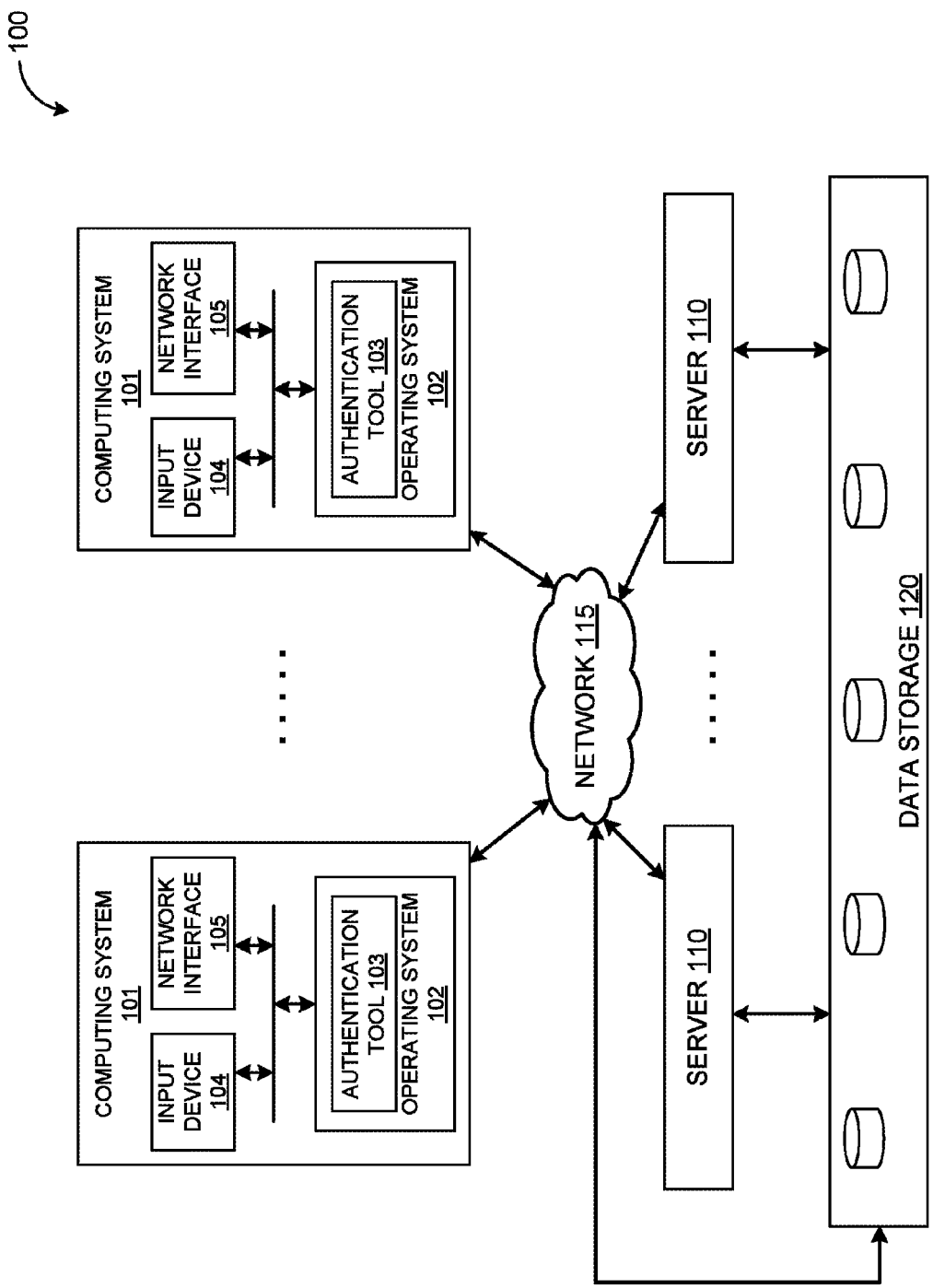
FIG. 1 is a block diagram of an exemplary system architecture in which embodiments of the invention may operate.

A method and system for authentication on a computing system are described. The computing system may be a computing device (e.g., a computer, a laptop computer, a personal digital assistant (PDA)) or a virtual machine (VM). In one embodiment, a user credential may be provided by a user to access a computing system, which may be locked. The user may attempt to access the computing system in order to perform operations on the computing system (e.g., install software, access files, change settings, access a memory location, etc.).

An authentication tool may operate on the computing system to grant/allow a user different levels of access to the computing system. The user may provide a credential including a user password and a one-time password (OTP). The authentication tool may grant a user varying levels of access (e.g., allow different types of operations or access to objects in the computing system) based on the validity of the user password and whether the authentication tool is able to authenticate the (OTP) and the user password.

In one embodiment, the authentication tool may grant the user a first level of access if the user password is valid but the authentication tool is unable to authenticate the OTP (e.g., the computing system cannot communicate with an authentication server). The authentication tool may also store the OTP and the user password for authentication at a later time. The first level of access may include limited permissions and/or access to the computing system. For example, the user may be unable to write to files, unable to access certain files, unable to access network resources, and/or unable to change configuration settings, with the first level of access. In another embodiment, the authentication tool may check whether the computing system is able to communicate with the authentication server at a later time (e.g., periodically check every 60 seconds, 5 minutes, etc.). If the computing system is able to communicate with the authentication at the later time, the authentication tool may retrieve the stored OTP and the user password and authenticate the stored OTP and the user password with the authentication server.

In one embodiment, the authentication tool may grant the user a second level of access if the user password is valid and the authentication tool is able to authenticate the OTP. The second level of access may include more permissions and/or access to the computing system than the first level of access. For example, the user may be able to read and write to all files, may be able to access network resources, and may be able to change system configuration settings, with the second level of access. In another embodiment, if the OTP is invalid (e.g., authentication of the OTP fails because the OTP is incorrect) then the computing system may perform one or more security measures.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

FIG. 1 illustrates an exemplary system architecture 100 in which embodiments of the present invention may operate. The system architecture 100 includes servers 110 coupled to computing systems 101 over a network 115. The servers 110 may be a personal computer (PC), a server computer, a personal digital assistant (PDA), a smart phone, a laptop computer, or any machine capable of executing a set of instructions (sequential or otherwise) that specify actions to be taken by that machine. The network 115 may be a private network (e.g., a local area network (LAN), a wide area network (WAN), intranet, etc.), a corporate network (e.g., a private network for an organization such as a corporation), and/or a public network (e.g., the Internet). The servers 110 are also coupled to data storage 120. The data storage 120 includes one or more mass storage devices (e.g., disks), which form a storage pool shared by all of the servers 110 and/or the computing systems 101. The data storage 120 may include files, emails, and/or data (e.g., sensitive information) which may be accessed by the computing system 101 and/or the servers 110.

In one embodiment the servers 110 may be authentication servers. An authentication server may authenticate user passwords, OTPs, and/or grant access to network resources (e.g., other servers) and/or network services. An authentication server may also provide an access ticket (e.g., a Kerberos Ticket Granting Ticket (TGT)) to a client (e.g., computing system 101) after authentication of the user password and/or an OTP. The access ticket (e.g., a TGT) may be used to access network locations, network resources, and/or network services. In another embodiment, the authentication server may be part of a Single Sign-On (SSO) system. In an SSO system, a user is generally authenticated by the authentication server and the authentication server grants access (e.g., via a TGT) to multiple devices, network resources, network locations, and/or network services, which use the SSO system for authentication.

An OTP may be an event-based OTP and/or a time-based OTP. A time based OTP is an OTP which is generated at periodic time intervals. For example, a security token may generate a time-based OTP every 60 seconds. For a time-based OTP, the security token may be synchronized in time with the authentication server, such that the authentication server is able to determine which OTP is generated for the current time interval. An event-based OTP is an OTP which is generated per login transaction or event (e.g., per request for an OTP). For example, a security token may generate an event-based OTP for every single login attempt. In another example, a security token may generate an OTP each time the user requests an OTP from the security token. A counter may be used to synchronize the OTPs generated by the security token with the authentication server. For an event-based OTP, the security token may be synchronized by event with the authentication server, such that the authentication server is able to determine which OTP is generated for the current event (e.g., login transaction). Certain embodiments described herein may operate in conjunction with event-based OTPs. Other embodiments described herein may operate in conjunction with a time-based OTP, where the authentication server is capable of using OTPs generated from prior periods of time (e.g., OTPs which were generated in the past) to authenticate a user. In these embodiments, the authentication server may store OTPs which were generated at prior periods of time (e.g., the authentication server may store all OTPs generated in the last 2 hours, 24 hours, etc.), or the authentication server may re-generate the previously generated OTPs (e.g., regenerate previous OTPs based on a seed value) so that these prior OTPs may be used to authenticate the user.

The computing systems 101 may include computing devices that have a wide range of processing capabilities such a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. The computing system 101 includes an input device 104, a network interface 105, an operating system 102, and an authentication tool 103.

In one embodiment, the input device 104 may include hardware, software, and/or a combination of both. For example, the input device 104 may include, but is not limited to, one or more of a keyboard, a mouse, a touch pad, a touch screen, a card reader (e.g., a smart card reader), a USB interface (e.g., a USB interface to communicate with a USB token device such as a YubiKey® token), a wireless interface (e.g., a Bluetooth interface to communicate with a wireless token device) and/or software and drivers associated with the input device 104. In another embodiment, the input device 104 may be used to accept user input (e.g., accept user credentials). For example, the user may use a keyboard and a mouse to enter a user password and/or an OTP. In another example, the user may use a keyboard and/or mouse to enter a user password and may use a USB interface to provide the OTP (e.g., via a YubiKey® token). Although one input device 104 is shown for the computing system 101, in other embodiments, multiple input devices 104 may be present. For example, a keyboard, a mouse, a USB interface, and a wireless interface may all be in the computing system 101.

In one embodiment, the network interface 105 may be used by the computing system 101 to communicate with the network 115, the servers 110, and/or the data storage 120. For example, the computing system 101 may access data and applications located on the servers 110 and/or data storage 120 using the network interface 105. In one embodiment, the network interface 105 may be used to communicate with an authentication server (e.g., one of the servers 110 may be an authentication server). The network interface 105 may be hardware, software, or a combination of both. For example, the network interface 105 may include, but is not limited to, a network interface card (NIC), a wireless network card, physical cables, and/or software and drivers associated with the network interface 105.

In one embodiment, the operating system 102 may manage hardware resources (e.g., peripheral devices such as a disc drive, input/output devices, memory, hard disk etc.), software resources (e.g., drivers, system files, etc.), and may manage execution of applications.

The operating system 102 may include an authentication tool 103. In one embodiment, the authentication tool 103 may provide users with different levels of access to the computing system 101, based on whether a user password provided by the user is valid, and whether the authentication tool 103 is able to authenticate an OTP. For example, if the user password is valid but the OTP cannot be authenticated (e.g., because the computing system 101 is unable to communicate with an authentication server or is offline), the user may be given a first level of access which may include limited permissions and/or access to the computing system 101. In another example, if the user password is valid and the OTP can be authenticated (e.g., the computing system 101 is able to communicate with an authentication server or is online), then the user may be given a second level of access to the computing system 101, which may include more permissions and/or access to the computing system 101 than the first level of access. In one embodiment, the operating system 102 may be an operating system with mandatory access control mechanisms (e.g., a Security Enhanced Linux (SELinux) operating system). These mandatory access control mechanisms may be used to control the levels of access and/or permissions a user (or an application) may have to files, settings, data, parameters, hardware, and/or network resources of the computing system 101.

In one embodiment, the authentication tool 103 may monitor a network connection status of the computing system 101 by determining whether the computing system 101 is online or offline. For example, the authentication tool 103 may periodically attempt to communicate with the authentication server (e.g., attempt to communicate once every 30 seconds, 1 minute, 1 hour, etc.). If the authentication tool 103 can communicate with the authentication server, then the network connection status of the computing system 101 is determined to be online. If the authentication tool 103 cannot communicate with the authentication server, then the network connection status of the computing system 101 is determined to be offline.

Although the authentication tool 103 is shown as part of the operating system 102 in FIG. 1, in another embodiment, the authentication tool 103 may be separate from the operating system 102. For example, the authentication tool 103 may be an application/process executing in conjunction with the operating system 102. In another example, the authentication tool 103 may include a hardware component, a software component, or a combination of both, on the computing system 101.

In one embodiment, a computing system 101 may become disconnected from the network 115 (e.g., unable to communicate with the network 115). For example, a computing system 101 (e.g., a laptop computer) may be connected to the network 115 (e.g., a corporate network or a secure network) during working hours. When the employee leaves the location and takes the computing system 101 with him, the computing system 101 may no longer be connected to the network 115. Because the computing system 101 is no longer connected to the network 115, the computing system 101 may not be able to communicate with the authentication server (e.g., server 110) and the authentication tool 103 may not be able to authenticate the OTP. If the authentication tool 103 is able to authenticate the user password but not the OTP (e.g., because the network connection status of the computing system is offline), the authentication tool 103 will grant the user a first level of access to the computing system 101 (e.g., limited permissions and/or access) and store the OTP and user password for authentication at a later time. After granting the first level of access to the computing system 101, if the authentication tool 103 is able to later authenticate the stored OTP and user password (e.g., the network connection status of the computing system 101 has changed to online), then the authentication tool 103 may grant a second level of access to the computing system 101 (e.g., grant more permissions and/or access).

In one embodiment, the authentication tool 103 may communicate with other components of the operating system 102 which may also be used to authenticate a user (e.g., authenticate credentials provided by the user). For example, the operating system, 102 may include a pluggable authentication module (PAM) which may accept credentials provided by a user. In another example, the operating system 102 may include a module for authenticating and/or managing access to a remote resource (e.g., a system security services daemon (SSSD) to authenticate an OTP with the authentication server). The authentication tool 103 may communicate with these components (e.g., the PAM and/or the SSSD) when authenticating a user.

In one embodiment, if the authentication tool 103 is unable to communicate with the authentication server (e.g., server 110), the authentication tool 103 may store the OTP in a memory. For example, the authentication tool 103 may store the last 44 characters of a user credential (e.g., a user password and a YubiKey® OTP) provided by the user because the last 44 characters of the user credential correspond to the YubiKey® OTP. When the authentication tool 103 communicates with the authentication server at a later time, the OTP may be retrieved from the memory and may be provided to the authentication server for authentication. In another embodiment, after a user has been authenticated, the authentication tool 103 may optionally store the user password (e.g., may cache the user password). The cached password may be hashed or otherwise encrypted. The cached and/or encrypted password may be used to authenticate a user during subsequent user logins.

Figure 2:
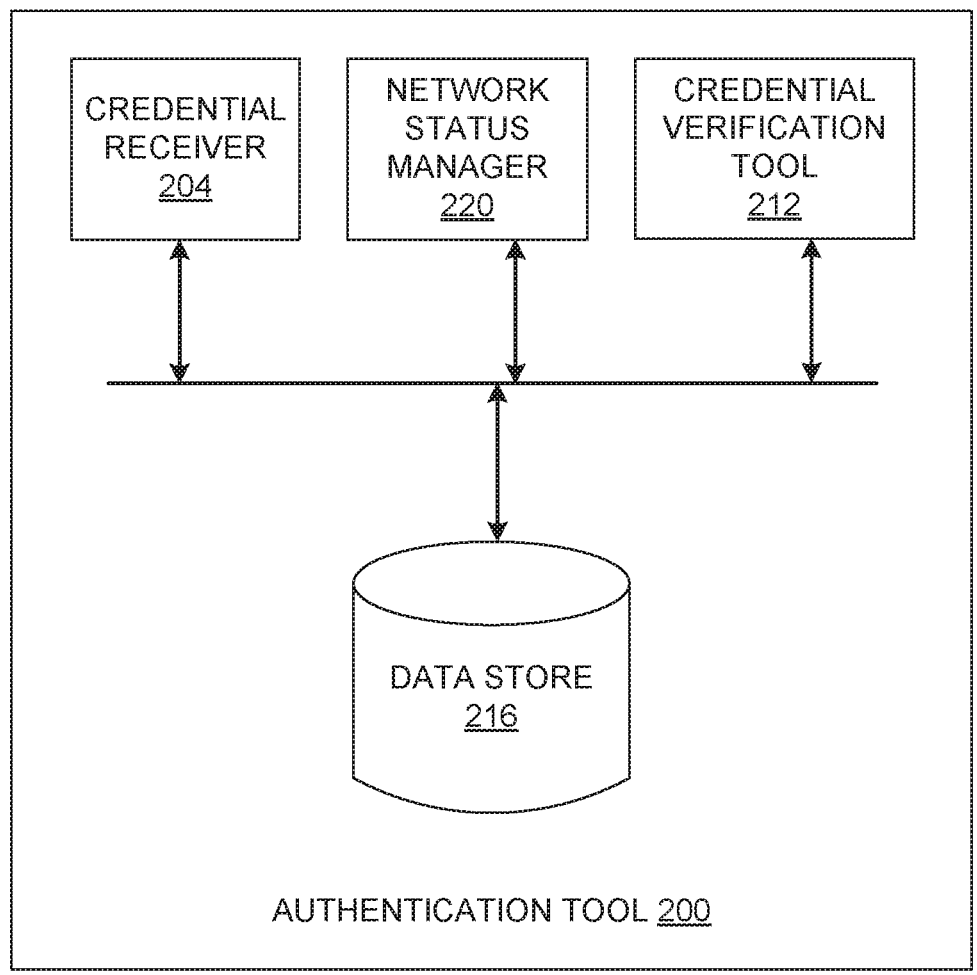
FIG. 2 is a block diagram illustrating one embodiment of an authentication tool according to one embodiment.

FIG. 2 is a block diagram illustrating one embodiment of an authentication tool 200. The authentication tool 200 may include a credential receiver 204, a credential verification tool 212, a network status manager 220, and a data store 216. More or less components may be included in the authentication tool 200 without loss of generality.

The credential receiver 204 may receive one or more credentials from a user and/or an input device. The credential receiver 204 may operate in conjunction with the input device 104 to receive the user credentials. For example, the user may provide a user password using a keyboard and the credential receiver 204 may receive the username and password from the keyboard. In one embodiment, the user may also provide an OTP via the input device 104, in addition to the user password. For example, the user may use the keyboard to type in both a user password and an OTP. The OTP may be generated from a token device (e.g., a security token such as Aladdin eToken®, OpenOTP®, etc.) and the user may enter the OTP using the keyboard. In another example, the user may enter the user password using the keyboard and provide the OTP using another input device (e.g., via a USB token, such as YubiKey®).

The network status manager 220 may monitor the connection status of the computing system 101. The network status manager 220 may use the network interface 105 when determining the network connection status of the computing system 101. For example, the network status manager 220 may determine whether the computing system 101 is connected to the network 115 via the network interface 105. In one embodiment, the network status manager 220 may determine that the computing system 101 has an "online" network connection status if the computing system 101 can communicate with the authentication server (e.g., server 110) and has an "offline" network connection status if the computing system 101 cannot communicate with the authentication server.

The data store 216 may store data related to one or more user credentials. For example, the data store 216 may store an OTP received by the computing system (e.g., received from a keyboard or from a security token). In another example, the data store may store multiple cached user passwords (e.g., one password per user of the computing system) or the user password provided by the user. In one embodiment, the cached password may be stored in the data store 216 from a previous user login to the computing system. For example, the authentication tool 200 may store the user password of the user from a previous successful login to the computing system 101. In another embodiment, the cached password may be provided to the authentication tool 200 by an external entity. For example, one or more user passwords may be stored in the data store 216 by a system administrator who may setup the computing device. In another example, one or more user passwords may be received from a server 110 and may be stored in the data store 216. Although the data store 216 is shown as part of the authentication tool 200, in other embodiments, the data store 216 may reside in a different location. For example, the data store 216 may be stored in a memory and/or a hard drive in the computing system 101.

The credential verification tool 212 may authenticate the user password and/or the OTP received by the authentication tool 200. The credential verification tool 212 may authenticate the user password provided by the user against a cached user password stored in the data store 216. The cached user password may be encrypted (e.g., hashed or encrypted for security purposes) and the credential verification tool 212 may process the user password (e.g., hash the user password) prior to authenticating the user password.

The credential verification tool 212 may also authenticate an OTP. In one embodiment, the credential verification tool 212 may provide the OTP and the user password to the authentication server (e.g., server 110) for authentication. If the credential verification tool 212 is unable to authenticate the OTP and the user password (e.g., because the computing system 101 cannot communicate with the authentication server), the credential verification tool 212 may grant the user a first level of access which may include more restricted access and/or permissions to the computing system 101. For example, the user may be given only read permissions to files and/or settings in the computing system 101. If the credential verification tool 212 is able to authenticate the OTP and the user password (e.g., because the computing system 101 can communicate with the authentication server), the credential verification tool 212 may grant the user a second level of access which may include greater access and/or permissions to the computing system 101, than the first level of access. For example, the user may be given read and write permissions to files and/or settings in the computing system 101.

Figure 3:
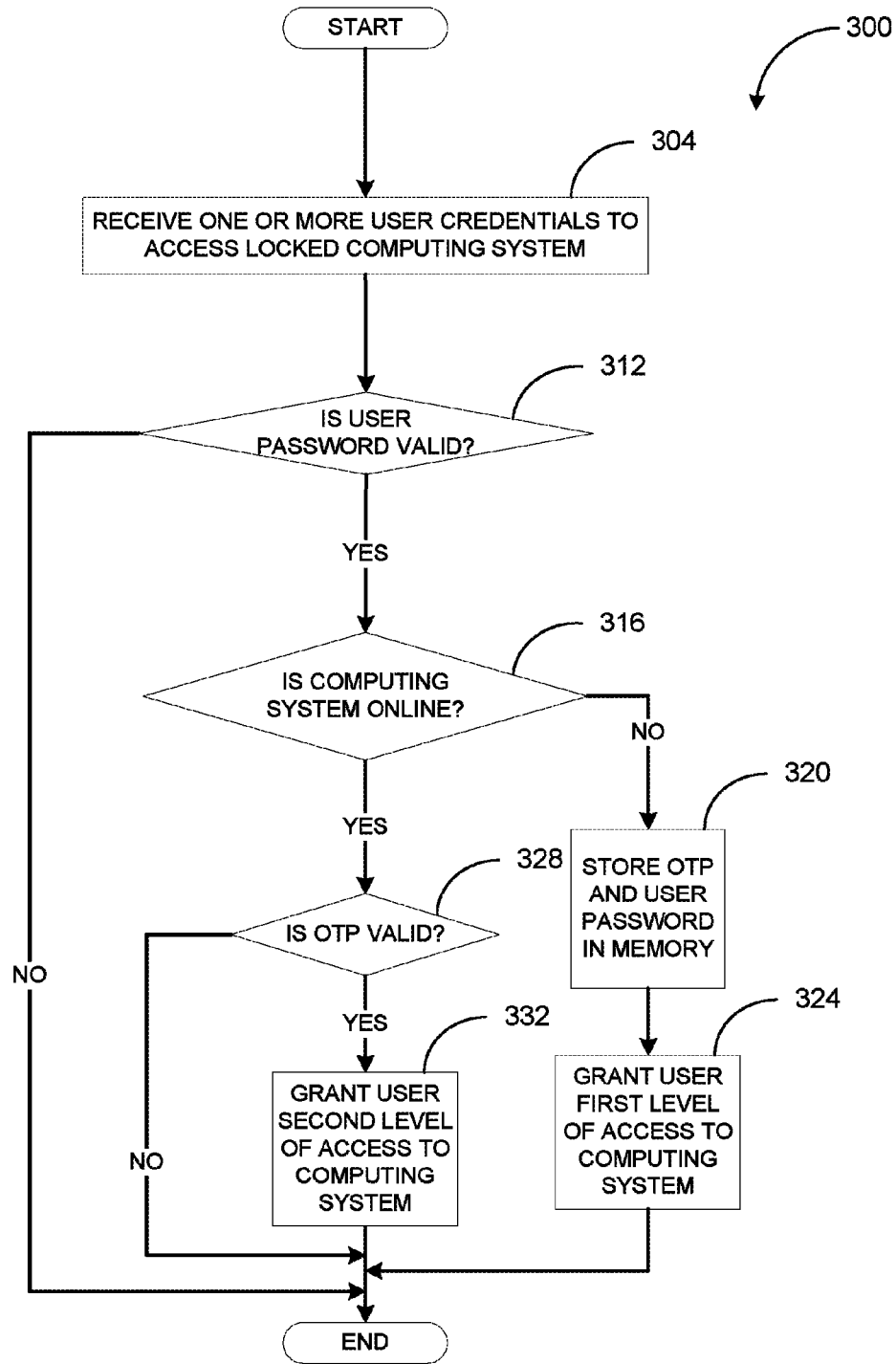
FIG. 3 is a flow diagram illustrating a method for granting access to a computing system, in accordance with one embodiment.

FIG. 3 is a flow diagram illustrating a method 300 for granting access to a computing system, in accordance with one embodiment. The method 300 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 300 is performed by a computing system (e.g., the computing system 101 of FIG. 1).

Referring to FIG. 3, the method 300 starts with the computing system receiving one or more user credentials to access the computing system (block 304). The computing system may be locked (e.g., access to the computing system may be restricted) and the user may provide one or more user credentials to gain access to (e.g., login to) the locked computing system. In one embodiment, the one or more user credentials may include a user password and an OTP. The OTP may be received from a security token (e.g., an OTP generation device such as a YubiKey® USB token) which may be coupled to the computing system. In another embodiment, the security token may not be coupled to the computing system but the security token may provide the OTP to the user (e.g., may display the OTP on a screen in the security token) and the user may provide the OTP to the computing system (e.g., via an input device such as a keyboard). The computing system checks whether the user password is valid (e.g., authenticates the user password) at block 312. As discussed above, the computing system may authenticate the user password using a cached password (e.g., a user password cached from a previous login). If the user password is not valid, the method 300 ends.

If the user password is valid, the method 300 proceeds to block 316 where the computing system determines whether the computing system is online. As discussed above, the computing system may determine that the computing system is online if it is able to communicate with an authentication server (e.g., server 110). If the computing system is not online (e.g., offline), the computing system stores the OTP and the user password in memory (block 320) and grants the user a first level of access to the computing system (block 324). As discussed above, the first level of access may include limited permissions and/or access to the computing system (e.g., read only access to files and system settings).

If the computing system is online, the computing system provides the OTP to the authentication server and the authentication server determines whether the OTP is valid (block 328). If the OTP is not valid, the method 300 ends and the user is denied access to the computing system. If the OTP is valid, then the computing system grants the user a second level of access to the computing system at block 332. Also as discussed above, the second level of access includes more permissions and/or access to the computing system than the first level of access granted at block 324 (e.g., read and write access to files and system settings).

In one embodiment (not shown in the figures), the authentication server may also provide the user with an access ticket at block 332. The access ticket may grant the user permissions and/or access to network locations (e.g., websites and/or particular servers), network services (e.g., processes or applications operating within the network), and/or the computing system. For example, the authentication server may provide the user with a Ticket Granting Ticket (TGT). The TGT may allow a user to access a particular server and may grant the user access to the computing system (e.g., read and write access to files and system settings). In another embodiment, the access ticket may be used in a Single Sign-On (SSO) system. In an SSO system, the SSO system may authenticate a credential (e.g., an OTP and/or a user password) and provide the user with the access ticket (e.g., the TGT). The access ticket may grant the user access to all services, devices, and locations which use the SSO system to authenticate users.

Figure 4:
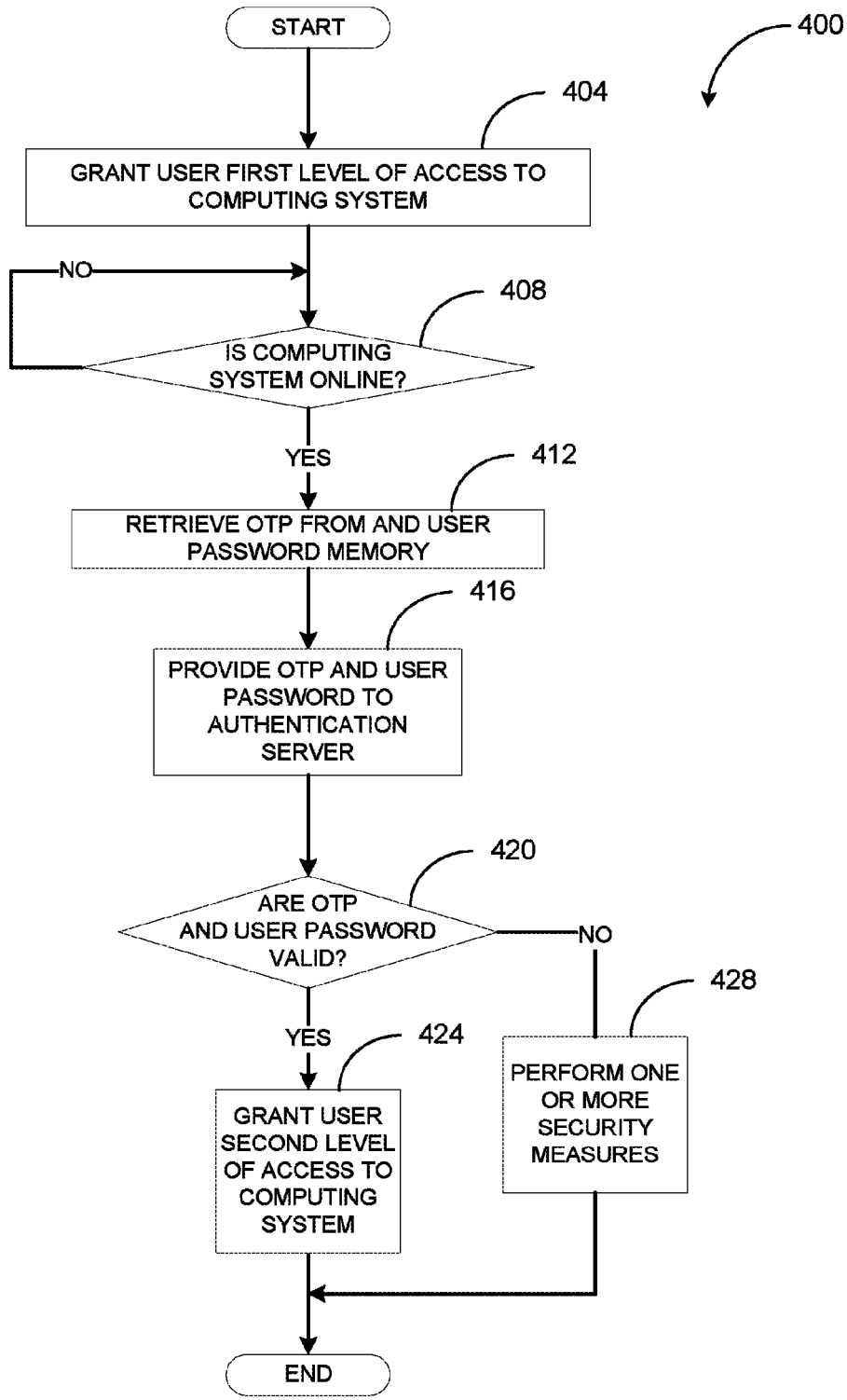
FIG. 4 is a flow diagram illustrating a method for granting access to a computing system, in accordance with another embodiment.

FIG. 4 is a flow diagram illustrating a method 400 for granting access to a computing system, in accordance with another embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a computing system (e.g., the computing system 101 of FIG. 1). In another embodiment, the method of 400 may be performed after the method 300 of FIG. 3 has been performed by the computing system. For example, the method 400 may be performed after block 324 of the method 300 shown in FIG. 3.

Referring to FIG. 4, the method 400 starts at block 404, where the user is granted a first level of access to the computing system. At block 408, the computing system determines whether or not the computing system is online (e.g., whether the computing system can communicate with an authentication server). If the computing system is not online, the method loops back to block 408. In one embodiment, the computing system may periodically determine whether or not the computing system is online (e.g., check once every 60 seconds, or every 5 minutes, etc.). If the computing system is online (e.g., the computing system can communicate with an authentication server), the computing system retrieves an OTP and the user password from memory (block 412). The OTP and the user password may have been previously provided to the computing system and previously stored in the memory by the computing system. For example, referring to FIG. 3, the OTP and the user password may have been previously obtained at block 308 and may have been previously stored in the memory at block 320.

At block 416, the computing system provides the OTP and the user password to the authentication server for authentication. If the OTP and the user password are valid (block 420), the computing system grants the user the second level of access to the computing system (block 424). As discussed above, the second level of access may include more access and/or permissions to the computing system than the first level of access. In one embodiment, as discussed above, the authentication server may also grant the user an access ticket at block 424. The access ticket may grant the user access to network locations, network services, network resources, and/or the computing system. If the OTP and/or the user password are not valid, the computing system may perform one or more security measures (block 428). Security measures may include one or more of: forcibly logging a user out of the computing system, prompting the user for a second OTP, reducing the user's access permissions (e.g., reducing the user's Security Enhanced Linux (SELinux) permissions or reducing a user's level of access using a mandatory access control mechanism), preventing execution or startup of different applications, preventing the computing system from establishing certain connections (e.g., prevent connections to remote servers), etc.

Figure 5:
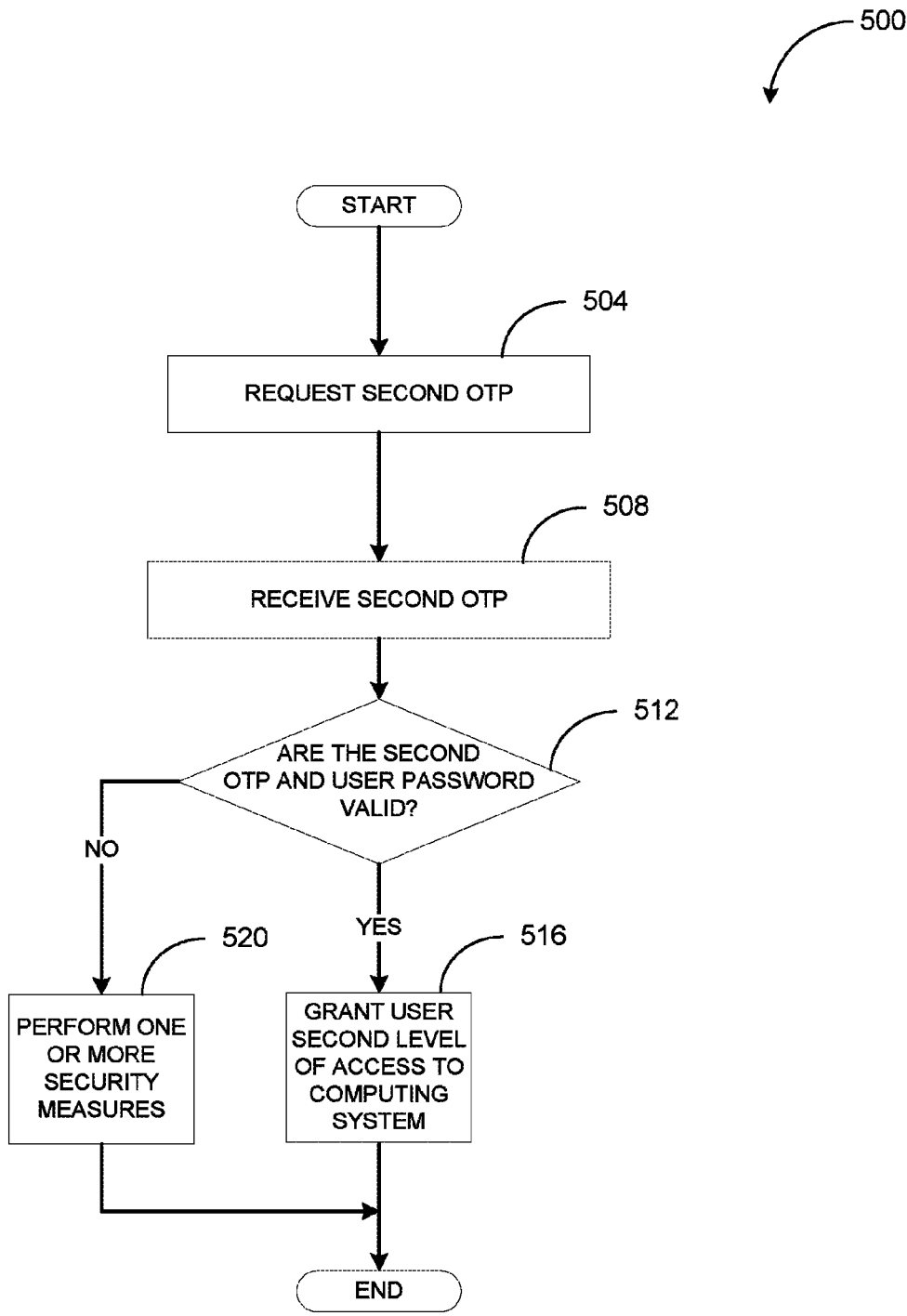
FIG. 5 is a flow diagram illustrating a method for granting access to a computing system, in accordance with a further embodiment.

FIG. 5 is a flow diagram illustrating a method for granting access to a computing system, in accordance with a further embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 is performed by a computing system (e.g., the computing system 101 of FIG. 1). In another embodiment, the method of 500 may be performed after the method 400 of FIG. 4 has been performed by the computing system. For example, the method 500 may be a security measure performed after block 428 of the method 400 shown in FIG. 4.

Referring to FIG. 5, the method 500 begins at block 504, wherein the computing system requests a second OTP. At block 508, the computing system receives the second OTP. In one embodiment, the second OTP may be provided by a user via an input device (e.g., typed in by a user via a keyboard). In another embodiment, the second OTP may be provided by a token device such as a YubiKey® USB token, via a USB interface of the computing system. The second OTP and the user password are provided to an authentication server for authentication, to determine if the second OTP is valid. If the second OTP and the user password are valid, the computing system grants the user the second level of access to the computing system at block 516. As discussed above, the second level of access may include more access and/or permissions to the computing system than the first level of access. In one embodiment, as discussed above, the authentication server may also grant the user an access ticket at block 516. The access ticket may grant the user access to network locations, network services, network resources, and/or the computing system. If the second OTP and/or the user password are not valid, one or more security measures are performed (block 520). For example, if the user password is not valid, the user may be forcibly logged out of the computing system and may be denied all access to the computing system. In another example, if the user password is valid, but the second OTP is not valid, another OTP may be requested (e.g., because the user entered the second OTP incorrectly, or because the second OTP may be out of sync with the OTPs generated/stored by the authentication server).

Figure 6:
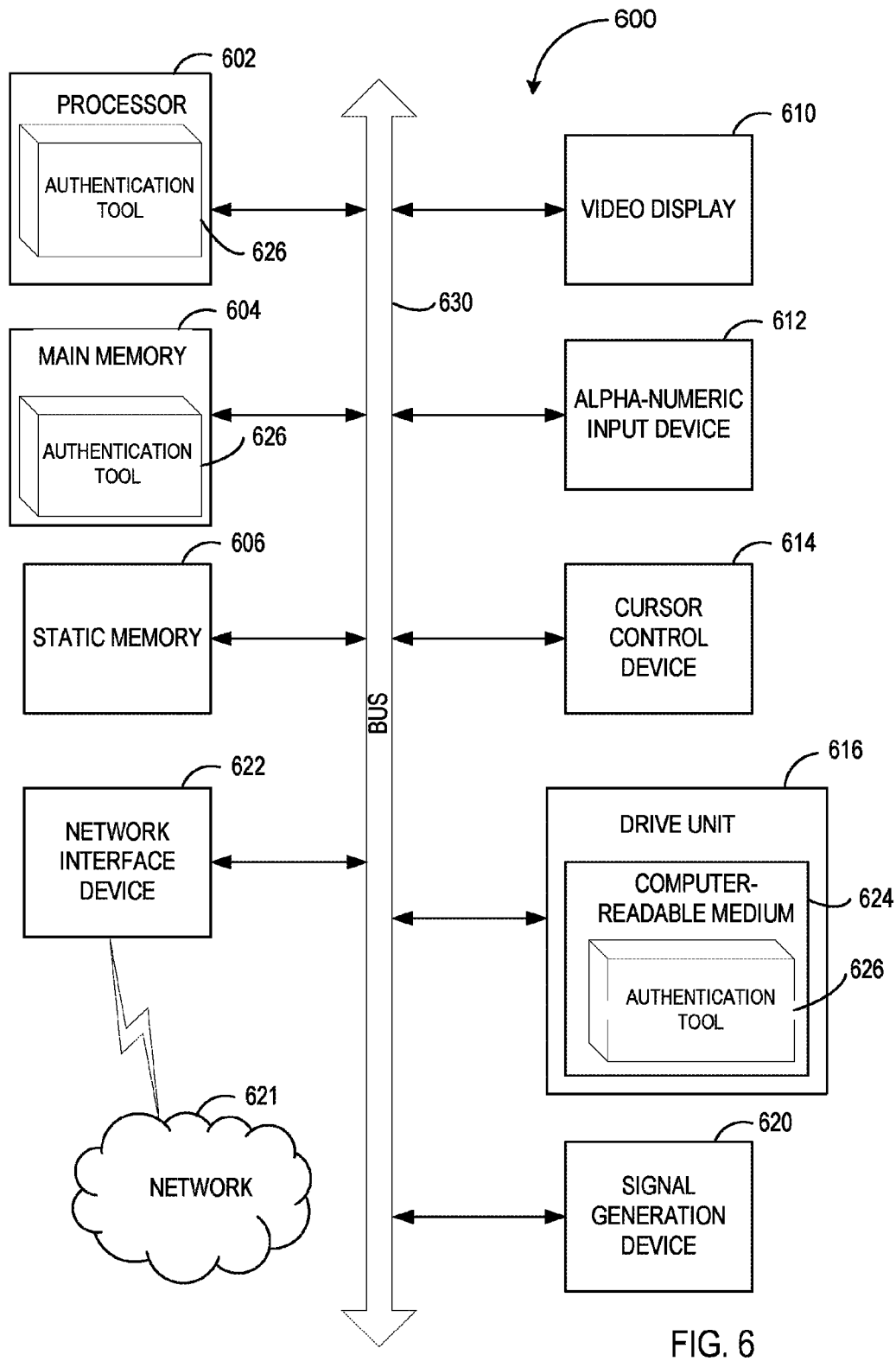
FIG. 6 illustrates a diagrammatic representation of a machine in the exemplary form of a computer system, in accordance with one embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device), which communicate with each other via a bus 630.

The processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute authentication tool 200 for performing the operations and steps discussed herein.

The computer system 600 may further include a network interface device 622. The network interface device may be in communication with a network 621. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a computer-readable storage medium (or more specifically a computer-readable storage medium) 624 on which is stored one or more sets of instructions for authentication tool 200 embodying any one or more of the methodologies or functions described herein. The instructions of the authentication tool 200 may also reside, completely or at least partially, within the main memory 604 and/or within the processing device 602 during execution thereof by the computer system 600, the main memory 604 and the processing device 602 also constituting computer-readable storage media. The instructions of the authentication tool 200 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present invention. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "authenticating," "storing," "detecting," "retrieving," "granting," "performing," "locking," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
receiving a credential to access a computer system, the credential comprising a user password and a one-time password (OTP);
in response to the computer system being unable to access an authentication server and unable to authenticate the OTP using the authentication server, storing, by a processor, the OTP and the user password to be used in a subsequent authentication by the authentication server and granting a user a first level of access to the computer system in view of authenticating the user password by the processor using a stored password and without authenticating the OTP;
checking whether the computer system is able to access the authentication server; and
in response to the computer system being able to access the authentication server, authenticating the stored OTP using the authentication server and granting, by the processor, the user a second level of access to the computer system, the second level of access being different than the first level of access.

2. The method of claim 1, further comprising:
in response to authenticating the stored OTP and the stored user password, granting the user an access ticket to access one or more of network resources and network services.

3. The method of claim 1 further comprising:
after failing to authenticate the stored OTP or the stored user password, performing one or more security measures.

4. The method of claim 3, wherein performing the one or more security measures comprises locking the computer system in response to the stored user password being invalid.

5. The method of claim 3, wherein performing the one or more security measures comprises:
requesting a second OTP if the stored OTP is invalid;
receiving the second OTP;
authenticating the second OTP and the stored user password using the authentication server; and
after authenticating the second OTP and the stored user password, granting the user the second level of access to the computer system.

6. The method of claim 5, further comprising:
after failing to authenticate the second OTP or the stored user password, locking the computer system.

7. The method of claim 1, wherein the OTP comprises an event-based OTP.

8. An apparatus comprising:
a memory to store a one-time password (OTP); and
a processor, operatively coupled to the memory, to:
receive a credential to access a computer system, the credential comprising a user password and the one-time password (OTP);
in response to the computer system being unable to access an authentication server and unable to authenticate the OTP using the authentication server, store the OTP and the user password to be used in a subsequent authentication by the authentication server and grant a user account a first level of access to the computer system in view of authenticating the user password using a stored password and without authenticating the OTP;
check whether the computer system is able to access the authentication server; and
in response to the computer system being able to access the authentication server, authenticating the stored OTP using the authentication server and granting the user account a second level of access to the computer system, the second level of access being different than the first level of access.

9. The apparatus of claim 8, wherein the processor is further to:
in response to authenticating the stored OTP and the stored user password, grant the user account an access ticket to access one or more of network resources and network services.

10. The apparatus of claim 8, wherein the processor is further to:
after failing to authenticate the stored OTP or the stored user password, perform one or more security measures.

11. The apparatus of claim 10, wherein to perform the one or more security measures, the processor is to lock the computer system in response to the stored user password being invalid.

12. The apparatus of claim 10, wherein to perform the one or more security measures, the processor to:
request a second OTP if the stored OTP is invalid;
receive the second OTP;
authenticate the second OTP and the stored user password using the authentication server; and
after authenticating the second OTP and the stored user password, grant the user account the second level of access to the computer system.

13. The apparatus of claim 12, wherein the processor is further to:
after failing to authenticate the second OTP or the stored user password, lock the computer system.

14. The apparatus of claim 8, wherein the OTP comprises an event-based OTP.

15. A non-transitory machine-readable storage medium comprising instructions that, when executed by a processor, cause the processor to:
receive a credential to access a computer system, the credential comprising a user password and a one-time password (OTP);
in response to the computer system being unable to access an authentication server and unable to authenticate the OTP using the authentication server, store, by the processor, the OTP and the user password to be used in a subsequent authentication by the authentication server and grant a user a first level of access to the computer system in view of authenticating the user password by the processor using a stored password and without authenticating the OTP;
check whether the computer system is able to access the authentication server; and in response to the computer system being able to access the authentication server, authenticate the stored OTP and the user password using the authentication server and granting, by the processor, the user a second level of access to the computer system, the second level of access being different than the first level of access.

16. The non-transitory machine-readable storage medium of claim 15, wherein the processor is further to:
in response to authenticating the stored OTP and the stored user password, grant the user an access ticket to access one or more of network resources and network services.

17. The non-transitory machine-readable storage medium of claim 15, wherein the processor further to:
after failing to authenticate the stored OTP or the stored user password, perform one or more security measures.

18. The non-transitory machine-readable storage medium of claim 17, wherein to perform the one or more security measures the processor to lock the computer system if the stored user password is invalid.

19. The non-transitory machine-readable storage medium of claim 17, wherein to perform the one or more security measures the processor to:
request a second OTP when the stored OTP is invalid;
receive the second OTP;
authenticate the second OTP and the stored user password using the authentication server; and
after authenticating the second OTP and the stored user password, grant the user the second level of access to the computer system.

20. The non-transitory machine-readable storage medium of claim 19, wherein the processor is further to:
after failing to authenticate the second OTP or the stored user password, lock the computer system.

* * * * *